United States Patent [19]

DePuy

[11] 3,999,109
[45] Dec. 21, 1976

[54] D-C MOTOR CONTROL CIRCUIT
[75] Inventor: Robert P. DePuy, Cherry Hill, N.J.
[73] Assignee: General Electric Company, Philadelphia, Pa.
[22] Filed: May 9, 1975
[21] Appl. No.: 575,873
[52] U.S. Cl. .............................................. 318/293
[51] Int. Cl.² ......................................... H02P 1/22
[58] Field of Search .......... 318/245, 248, 280, 291, 318/293, 300

[56] References Cited
UNITED STATES PATENTS

| 2,782,995 | 2/1957 | McCormack | 318/293 X |
| 3,051,881 | 8/1962 | Baudin | 318/291 X |
| 3,146,390 | 8/1964 | Wolff | 318/293 X |
| 3,458,790 | 7/1969 | Wilkerson | 318/293 X |
| 3,641,409 | 2/1972 | Maeda et al. | 318/280 X |

Primary Examiner—Robert K. Schaefer
Assistant Examiner—W. E. Duncanson, Jr.
Attorney, Agent, or Firm—J. Wesley Haubner

[57] ABSTRACT

A control circuit for reversibly driving a motor from a small d-c voltage. A switched a-c voltage source is selectively applied to the primary windings of either of two voltage step down transformers. The a-c voltage of each secondary winding is rectified and applied to the motor through a series resistor. The rectified voltage from one transformer drives the motor in one direction and the rectified voltage from the other transformer drives the motor in the reverse direction.

4 Claims, 1 Drawing Figure

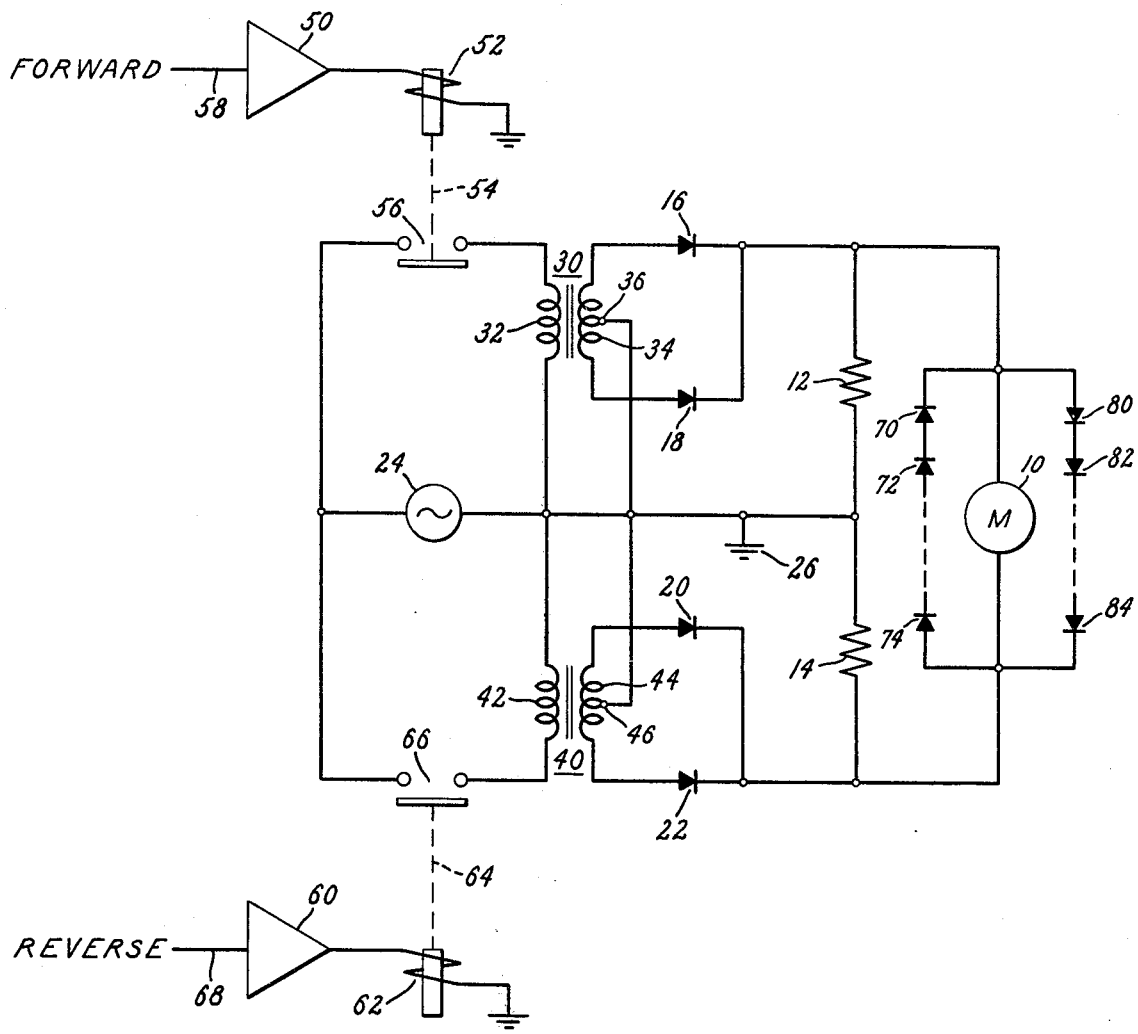

D-C MOTOR CONTROL CIRCUIT

BACKGROUND OF THE INVENTION

The present invention relates to a motor drive circuit and in particular to a circuit for controlling low voltage d-c motors.

D-C motors are often used in control applications, for example, to drive a potentiometer. Generally, the d-c voltage is applied to the motor armature through either switch or relay contacts. A problem exists when the d-c voltage being applied to the motor through the relay contacts is small, say, for example, 5 volts. It is well known that such low voltages may not be sufficient to initiate current flow through some relay contacts under poor operating conditions which may occur, for example, when the contacts are dirty. According to one design practice the voltage applied across the relay contacts should be about 25 volts for each set of series-connected contacts in order to provide reasonable assurance that current will flow through the closed contacts. Since 25 volts is much greater than the 5 volts required to run the motor, a voltage divider scheme is required to reduce the voltage applied to the motor.

In one prior art motor drive circuit a 100 volt d-c source is applied to the motor through current limiting resistors and double pole, double throw reversing contacts. As is common in the art, zener diodes along with appropriate blocking diodes can limit the voltage across the motor to the required 5 volts. This prior art circuit results in a very inefficient use of electrical power as about 19 times as much power is dissipated in the current limiting resistors and voltage limiting diodes as in the motor.

It is therefore, the object of my invention to provide an improved circuit that uses relay or switch contacts for applying low d-c voltages to the armature of a d-c motor.

SUMMARY OF THE INVENTION

In accordance with this invention a first set of contacts selectively connects an a-c source across the primary winding of a first voltage step-down transformer and a second set of contacts selectively connects the a-c source across the primary winding of a second voltage step-down transformer. The secondary windings of the transformers have grounded centertaps. Each secondary voltage is rectified to provide the same polarity of voltage with respect to ground and each rectified voltage is applied to a respective terminal of the motor. The circuit parameters may be selected so that the magnitude of the rectified voltage is very near the optimum voltage that drives the motor. Two resistors of equal value are connected in series and the series combination is connected in parallel with the motor. The junction of the two resistors is grounded. When the first set of contacts are closed and the second set of contacts are opened, the rectified voltage from the first transformer will drive the motor in one direction. When the second set of contacts are closed and the first set of contacts are opened, the rectified voltage from the second transformer will drive the motor in the other direction.

DESCRIPTION OF THE DRAWINGS

While the specification concludes with claims particularly pointing out and distinctly claiming that which is regarded as the present invention, the objects and advantages of this invention can be more readily ascertained from the following description of a preferred embodiment when read in conjunction with the drawing which is a schematic diagram of the motor control circuit.

DETAILED DESCRIPTION

As shown in the FIGURE, resistor 12 is connected in series with resistor 14 and the series combination is in parallel with the d-c motor 10. The junction of resistors 12 and 14 is connected to common 26.

An a-c voltage source 24 is applied across the primary winding 32 of voltage step-down transformer 30 through relay contacts 56, and across the primary winding 42 of voltage step-down transformer 40 through relay contacts 66.

The centertap 36 of transformer 30 and the centertap 46 of transformer 40 are connected to common 26. One end of secondary winding 34 is connected to the anode of diode 16 and the other end of secondary winding 34 is connected to the anode of diode 18. The cathodes of diodes 16 and 18 are connected together and to one terminal of the motor 10. The diodes provide full wave rectification of the a-c signal appearing at the secondary winding 34 thereby providing a unipolar voltage at the cathodes of diodes 16 and 18 that is positive with respect to the common 26. In a similar manner, one end of secondary winding 44 is connected to the anode of diode 20, the other end of secondary winding 44 is connected to the anode of diode 22, and the cathodes of diodes 20 and 22 are connected to each other and to the other terminal of motor 10. Thus, diodes 20 and 22 provide full wave rectification of the a-c signal appearing at the secondary winding 44 thereby providing a unipolar voltage at the cathodes of diodes 20 and 22 that is also positive with respect to common 26.

Contacts 56 are operated by relay 52 as indicated by the dashed line 54 and contacts 66 are operated by relay 62 as indicated by the dashed line 64. Relays 52 and 62 are energized by relay driver amplifiers 50 and 60 respectively. The relay driver amplifiers 50 and 60 are controlled by appropriate signal levels at their respective inputs 58 and 68. Although the described embodiment shows relay contacts in the transformer primary circuits, it will be apparent to those skilled in the art that they could be replaced by switch contacts.

In certain applications the voltage level of the a-c source 24 may not be adjustable and the rectified voltage level appearing at the cathodes of diodes 16 and 18 or 20 and 22 may be too large for the desired motor speed. In such cases a first plurality of series-connected, similarly poled as shown, diodes 70, 72, ---, and 74 can be connected across the motor 10 to limit the voltage across motor 10 when transformer 40 is energized. Similarly, a second plurality of series-connected, similarly poled as shown, diodes 80, 82, ---, and 84 can be connected across the motor 10 to limit the voltage across the motor 10 when transformer 30 is energized. It will be apparent to those skilled in the art that other circuit means utilizing, for example, zener diodes connected in parallel with motor 10 can be used to limit the voltage across the motor 10.

The circuit operation will now be described. To drive the motor 10 in the forward direction, an appropriate signal level at the FORWARD input 58 will cause the relay driver 50 to energize the relay 52 which closes contacts 56, while an appropriate signal level at the REVERSE input 68 will cause relay driver 60 to be de-energized which opens contacts 66. Thus, transformer 40 is not energized and transformer 30 is energized. Diodes 16 and 18 rectify the a-c voltage appearing at the secondary winding 34 to provide a unipolar voltage at the cathodes of diodes 16 and 18 that is positive with respect to common 26. This unipolar voltage causes current to flow down through motor 10 and up through resistor 14 to common 26, and the motor 10 will rotate in the forward direction. If the unipolar voltage level at the cathodes of diodes 16 and 18 exceeds the sum of the forward voltage drops across diodes, 80, 82, . . . , 84, the diodes will become conductive and limit the voltage across the motor 10. In a similar manner, the motor 10 will be caused to rotate in the reverse direction by the unipolar voltage appearing at the cathodes of diodes 20 and 22 when contacts 66 are closed and contacts 56 are opened.

To stop the motor 10, contacts 56 and 66 are both opened by appropriate signal levels at the inputs 58, 68 of relay driver circuits 50 and 60. When contacts 56 and 66 are both opened the motor armature current will flow around the loop formed by the motor 10 and resistors 12 and 14. In this mode resistors 12 and 14 act as an electrical brake and help the motor to more quickly come to a stop.

In one preferred embodiment transformers 30 and 40 are filament transformers and the a-c source 24 is 115 volts. Since the relay contacts 56, 66 have a high voltage (115 volts) impressed across them they will reliably provide a low impedance connection when closed and properly energize the primary windings 32, 42 of transformers 30 and 40. Since the voltage level (6.3 volts) at the secondary windings 34, 44 of transformers 30 and 40 is close to the voltage to be applied across the motor, the secondary circuit is more efficient than the previously described prior art motor drive circuit. The efficiency of the circuitry of the FIGURE can be further improved by designing the circuit to provide the minimum voltage level at the cathodes of diodes 16, 18, 20 and 22 that is required to satisfactorily drive the motor 10. This voltage can be selected by controlling the turns ratio of transformers 30 and 40 or by varying the voltage level of the a-c source 24.

While the present invention has been described with reference to a specific embodiment thereof, it will be obvious to those skilled in the art that various changes and modifications may be made without departing from the invention in its broader aspects.

What is claimed as new and desired to be secured by Letters Patent of the United States is:

1. A circuit for reversibly driving a motor from an a-c voltage source comprising:
   a. first switch means for selectively connecting the a-c voltage source across the primary winding of a first transformer;
   b. a first rectifying means for generating a unipolar voltage with respect to a reference connected in series with the secondary of the first transformer and with one terminal of the motor;
   c. a first resistor connected in series with the other terminal of the motor and the reference;
   d. second switch means for selectively connecting the a-c voltage source across the primary winding of a second transformer;
   e. a second rectifying means for generating a unipolar voltage with respect to the reference connected in series with the secondary of the second transformer and with said other terminal of the motor; and
   f. a second resistor connected in series with said one terminal of the motor and the reference; whereby current is supplied to the motor in one direction when the a-c voltage source energizes the first transformer and in the other direction when the a-c voltage source energizes the second transformer.

2. A circuit as recited in claim 1 additionally comprising: diode means connected in parallel with the motor for limiting the voltage applied across the motor.

3. A circuit as recited in claim 1 wherein the secondary windings of the first and second transformers have centertaps connected to the reference and wherein the first and second rectifying means are full wave rectifiers.

4. A circuit as recited in claim 3 wherein the secondary windings of the first and second transformers have centertaps connected to the reference and wherein the first and second rectifying means are full wave rectifiers.

* * * * *